United States Patent [19]

Andro et al.

[11] 4,283,206
[45] Aug. 11, 1981

[54] COMPONENT FOR DE-SPINNING A FLOW OF DRY VAPOR OR GAS AND LIQUID AND FOR SEPARATING THE LIQUID FROM THE VAPOR OR GAS

[75] Inventors: Jean Andro, La Celle Saint-Cloud; Roger Bessouat, Paris; Jean-Pierre Cerdan, Houilles; Patrick Talleu, Chatou, all of France

[73] Assignees: Stein Industrie, Velizy-Villacoublay; Electricite de France, Paris, both of France

[21] Appl. No.: 36,701

[22] Filed: May 7, 1979

[30] Foreign Application Priority Data

May 12, 1978 [FR] France .................. 78 14213
Apr. 6, 1979 [FR] France .................. 79 08783

[51] Int. Cl.³ ............................................. B01N 45/04
[52] U.S. Cl. ............................. 55/187; 55/201; 55/416
[58] Field of Search ............. 55/184, 187, 199, 201, 55/202, 413, 416, 456, 457

[56] References Cited

U.S. PATENT DOCUMENTS

| 1,816,633 | 7/1931 | Bull ............................. 55/456 |
| 2,214,658 | 9/1940 | Browning ................... 55/416 X |
| 2,506,298 | 5/1950 | Griffen ....................... 55/416 |
| 2,936,043 | 5/1960 | Armstrong et al. ....... 55/416 |
| 3,216,182 | 11/1965 | Cochran et al. .......... 55/416 |

FOREIGN PATENT DOCUMENTS 460336 6/1926 Fed. Rep. of Germany ............. 55/416
1397181 3/1965 France .

Primary Examiner—John Adee
Attorney, Agent, or Firm—Sughrue, Mion, Zinn, Macpeak and Seas

[57] ABSTRACT

A component for de-spinning a flow of dry vapor or gas and for separating liquid from the vapor or gas, said component including an outer vertical tube (4) for admission of a mixture of the vapor or gas and a liquid for separation which mixture is caused to spin and flow downwards. The component further comprises a coaxial inner tube (1) for collecting dry vapor or gas, provided with means (2) for de-spinning the flow of said dry vapor or gas, the lower edge of the outer tube being at a level lower than that of the upper edge of the inner tube. There are orifices formed in the periphery of the lower edge of the outer tube whose width decreases upwards, and parts for de-spinning the liquid which drops by gravity along the wall of the outer tube. Application to wet steam separators.

7 Claims, 5 Drawing Figures

COMPONENT FOR DE-SPINNING A FLOW OF DRY VAPOR OR GAS AND LIQUID AND FOR SEPARATING THE LIQUID FROM THE VAPOR OR GAS

BACKGROUND OF THE INVENTION

The present invention relates to a component for despinning a flow of dry vapour or gas and for separating liquid from vapour or gas, said component including an outer vertical tube for admission of the vapour or gas and liquid mixture to be separated which is set in a downward spinning flow and a coaxial inner tube for collecting dry vapour or gas, provided with means for de-spinning the flow of said dry vapour or gas, the lower edge of the outer tube being at a level lower than that of the upper edge of the inner tube.

Known components of this type, in which the liquid which streams along the inner wall of the outer tube and the wet vapour or gas in its vicinity is spinning, do not provide very good separation of the liquid from the vapour or gas, due to the fact that the path of the vapour or gas which tends to rise between the tubes and the path of the liquid which continues to stream downwards from the lower edge of the outer tube cross each other, so that the liquid still entrains vapour or gas and the vapour or gas which rises entrains droplets in liquid.

U.S. patent application n° 955 237 of Oct. 27, 1978, by the applicants relates to auxiliary devices for separating liquid from still wet vapour. However, such devices complicate the equipment somewhat and increase its bulk.

SUMMARY OF THE INVENTION

The present invention aims to provide a component for de-spinning the flow of dry vapour or gas and for separating liquid from vapour or gas and for providing vapour or gas with a low liquid content and liquid with a low vapour or gas content as soon as they are separated from each other, without appreciably increasing the complexity of the equipment of a separator for separating liquid from vapour or gas and without modifying its bulk.

The component according to the invention is characterized in that it includes orifices formed in the periphery of the lower edge of the outer tube whose width decreases upwards and preferably further includes parts for de-spinning the flow of liquid which descends by gravity along the inner wall of the outer tube.

It further includes preferably at least one of the following characteristics:

The orifices formed round the periphery of the lower edge of the outer tube have a generally triangular shape with an upturned apex, followed, at the bottom, by a cut-out with vertical edges and the component further includes parts for de-spinning the flow of liquid which descends by gravity along the inner wall of the outer tube;

the edges of the orifices project from the inner wall of the outer tube so as to direct the liquid which streams thereon towards the solid parts on either side of the orifices;

the parts for de-spinning the flow of liquid are constituted by steel sheets welded to the lower portion of the outer tubes and inclined with respect to the vertical, so as to deflect the flow direction of the water which streams on the inner wall of the outer tube towards the vertical;

the lower portion of the tube is surrounded by a polygonal frame which comprises, at each angle, shoulders which co-operate with the shoulders of the frames of the adjacent components to provide slots parallel to the sides of the frames, said slots allowing the vapour or gas substantially free from liquid removed through the orifices of the periphery of the outer tube to flow upwards between the frames;

the orifices formed on the periphery of the lower edge of the outer tube have axes which are inclined with respect to the vertical by an angle which corresponds substantially to the angle with the vertical of the direction of flow of the liquid along the inner wall of the outer tube;

when the orifices project from the inner wall of the outer tube, the longest edges of the orifices have rims welded to the inner tube; and the edges of the openings have a substantially parabolic shape.

BRIEF DESCRIPTION OF THE DRAWINGS

Two embodiments of the invention are described hereinafter in greater detail.

DESCRIPTION OF THE PREFERRED EMBODIMENTS

Figure 1:
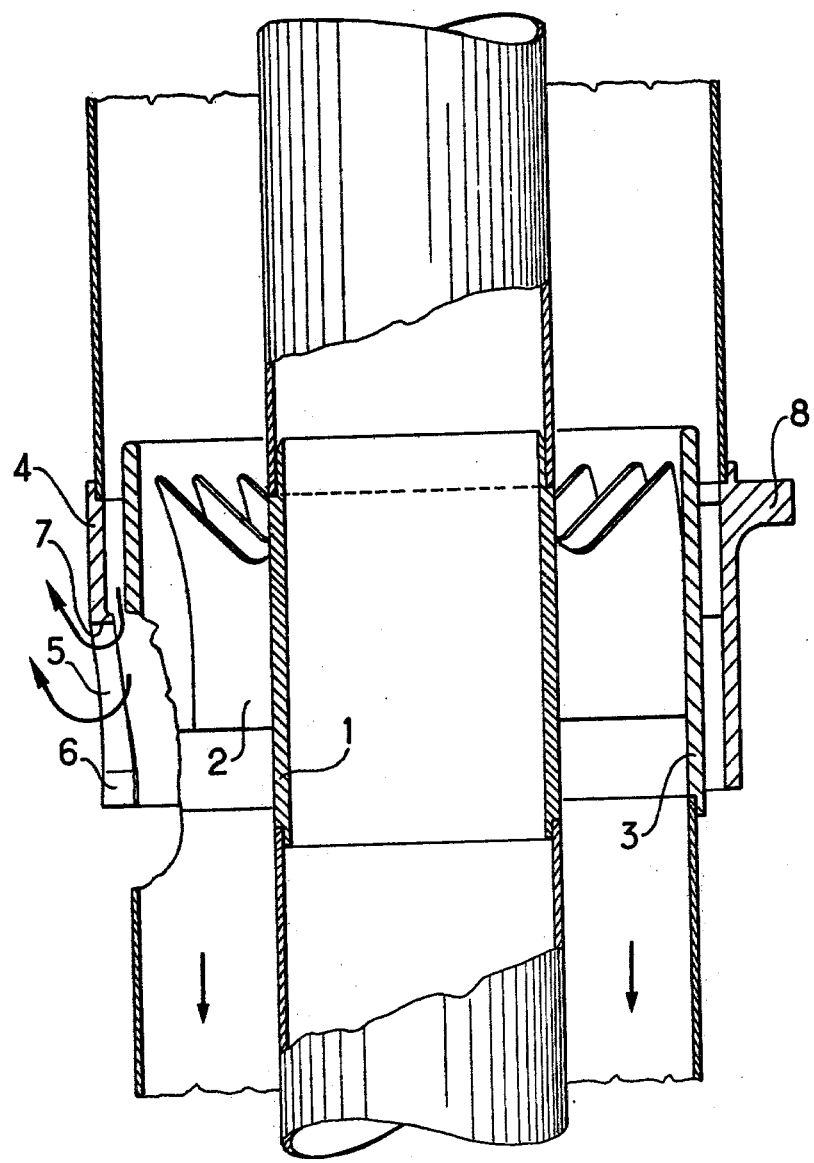
FIG. 1 illustrates a first embodiment of a component in accordance with the invention, showing an axial cross-section along the axis I—I of FIG. 2.
Figure 2:
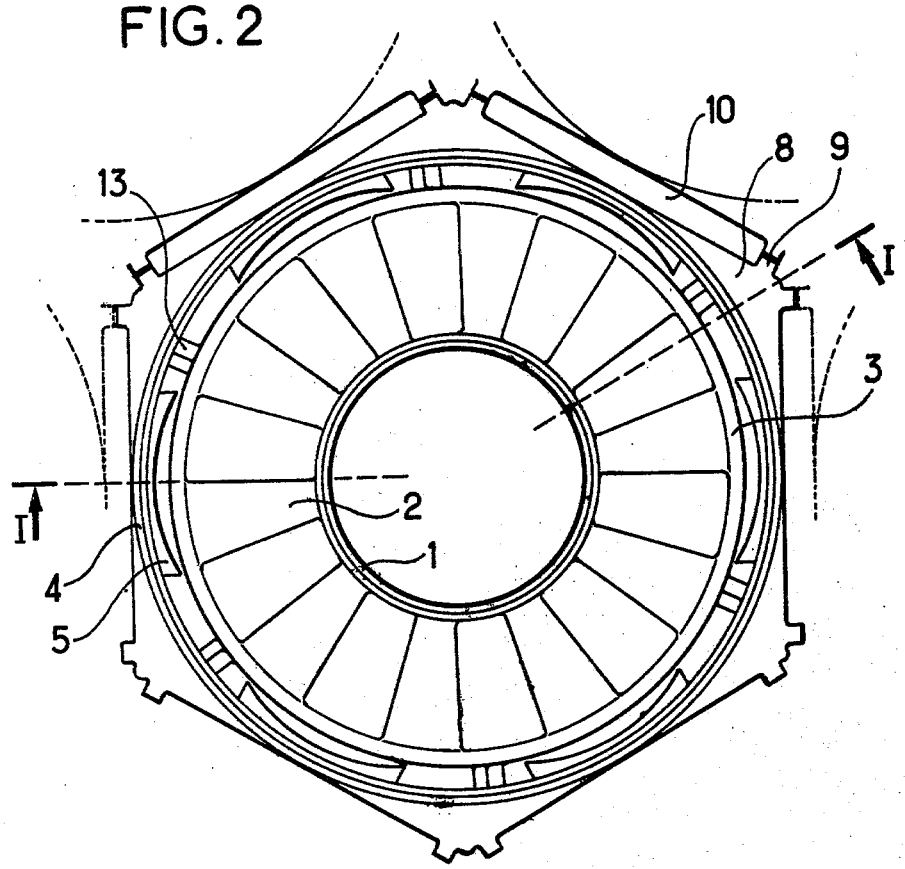
FIG. 2 illustrates a plan of the same component seen from above.
Figure 3:
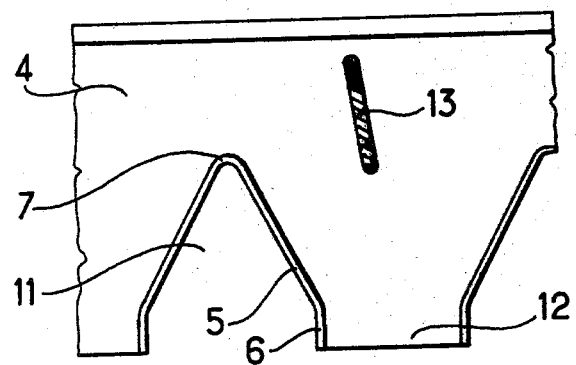
FIG. 3 is a developed partial view of the inner wall of the outer tube illustrated in FIG. 1.

The component shown in FIG. 1 forms a part of a "cyclone" separator on a wet steam circuit which comes from an expansion turbine in an electric energy power production plant. An inner sleeve 1 is provided on its periphery with blades 2 for de-spinning the flow of dry steam which are also fixed to an inner tube 3. The latter is disposed at a short distance from the inner wall of an outer tube 4, so as to form a constriction of the flow cross-section provided for the liquid and the wet steam and consequently and acceleration of the liquid flow downwards below the edge of the outer tube 4 in the form of streams. Said outer tube has openings 11 (FIG. 3) with a generally triangular shape (part 5) spaced at regular intervals round its lower edge. The openings end in a vertical portion 6 and their edges project radially inwards as seen at 7 in FIG. 1, so that the water which streams on the inner surface of the tube is distributed on either side of the openings, flowing on the solid parts 12 (FIG. 3) while the steam escapes through the openings. The component includes a hexagonal frame 8 and stops 9 at the angle of the frame allow slots 10 to be provided between two adjacent components, said slots allowing the separated steam which comes from the openings to rise between the outer tubes.

The flow of water on the inner surface of the outer tube is de-spun by sheet metal components 13 welded on that surface and orientated so as to deflect the flow vertically.

The above-mentioned outer and inner tubes are naturally designed to be welded on the outer and inner tubes of a separator with a nest of separation tubes whose upper ends include units which spin the wet steam, the inner tubes extending by dry steam removal tubes which lead into a dry steam chamber.

Figure 4:
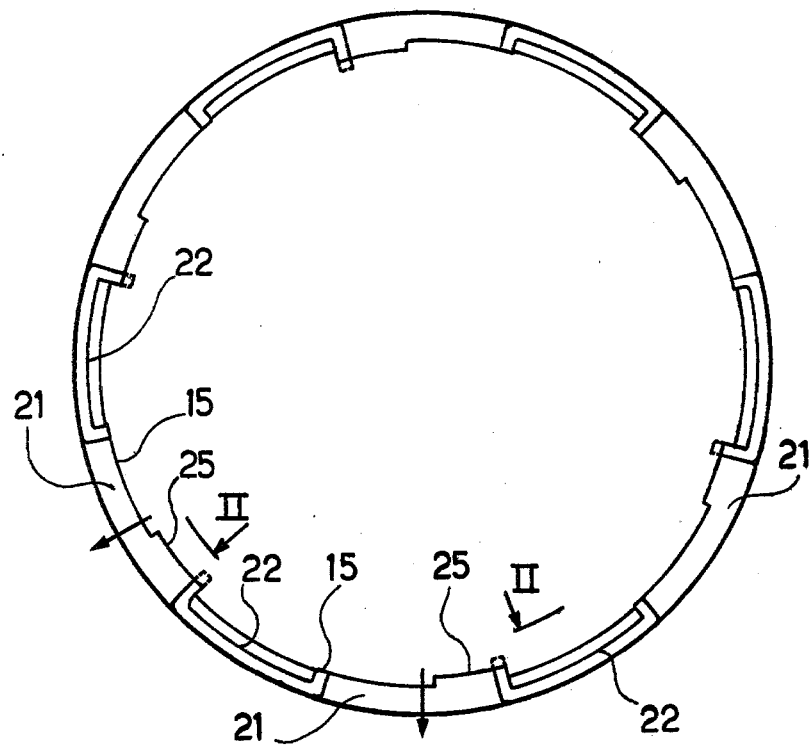
FIG. 4 is a cross-section through a plane perpendicular to the axis of the outer tube of a second embodiment of a component in accordance with the invention at the vapour removal orifices.
Figure 5:
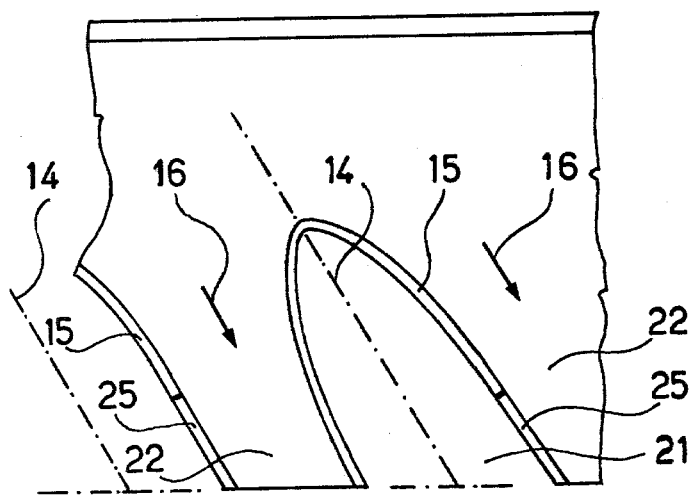
FIG. 5 is a developed view of a portion of the inner tube of the component illustrated in FIG. 4, along axis V—V of FIG. 4.

In FIGS. 4 and 5, the lower portion of the outer tube of the separator component has openings 21 separated by solid portions 12. But it has no inserted sheet metal components for de-spinning the flow of water which streams along the inner wall of the tube. The openings have no vertical axis but have a parabolic shape and are oblique, their axes 14 forming an angle of 30°, for example, in relation to the vertical, so that they lie substantially parallel to the flow direction of the water, represented by arrows 16, said flow direction being a function of the angle of original spin of the mixture to be separated.

The edges of the openings 15 project radially inwards and the ends of their longest sides have rims 25 which project further and which are welded on the inner tube, so as to prevent vibrations.

Although the de-spinning and separating components which have just been described with reference to the figures appear to be the preferred embodiments, it will be understood that various modifications can be made thereto without going beyond the scope of the invention, it being possible to replace some of their components by others which could fulfill the same technical function. In particular, the openings in the bottom of the outer tube can have a substantially parabolic shape instead of a triangular shape. The sheet metal plates for deflecting the flow of the liquid can be curved instead of plane and their inclination with respect to the vertical can be different. When the axes of the orifices are inclined with respect to the vertical, their inclination must be adapted to the flow conditions of the water streaming in the outer tube.

We claim:

1. A component for de-spinning a flow of dry vapour or gas and for separating liquid from vapour or gas, said component including concentrically, in inverse order, an outer vertical tube for admission of the vapour or gas and liquid mixture to be separated and travelling in a downward spinning flow, a coaxial inner tube for collecting dry vapour or gas, and an inner sleeve, said inner and outer tubes being cylindrical of circular cross-section, means positioned between the inner tube and said inner sleeve for de-spinning the flow of said dry vapour or gas, the lower edge of the outer tube being separate from the inner tube and at a level lower than that of the upper edge, and said lower edge of said outer tube being provided with upwardly extending orifices circumferentially spaced on its periphery, whose width decreases upwards.

2. A component according to claim 1, wherein the orifices are formed around the periphery of the lower edge of the outer tube and have a generally triangular shape with an upturned apex, followed, at the bottom, by a cut-out with vertical edges and said component further including parts for de-spinning the flow of liquid which descends by gravity along the inner wall of the outer tube.

3. A component according to claim 1 wherein the edges of said outer tube at the orifices project radially from the inner wall of the outer tube so as to direct the liquid which streams thereon towards the solid parts on either side of the orifices.

4. A component according to claim 2, wherein the parts for de-spinning the flow of the liquid are constituted by straight steel sheets welded to the inner wall of the outer tube and inclined with respect to the vertical, so as to deflect the flow direction of the water which streams on the inner wall of the outer tube towards the vertical.

5. A component according to claim 1, wherein the orifices are formed on the periphery of the lower edge of the outer tube and have axes and are inclined with respect to the vertical by an angle which corresponds substantially to the angle with the vertical of the direction of flow of the liquid along the inner wall of the outer tube.

6. A component according to claim 5, wherein the edges of the outer tube defining said orifices project radially from the inner wall of the outer tube and the lower portion of the longest edge of the orifices includes a rim welded to the inner tube.

7. A component according to claim 5, wherein the edges of the outer tube defining said orifices have a substantially parabolic shape.

* * * * *